United States Patent Office 2,933,935
Patented Apr. 26, 1960

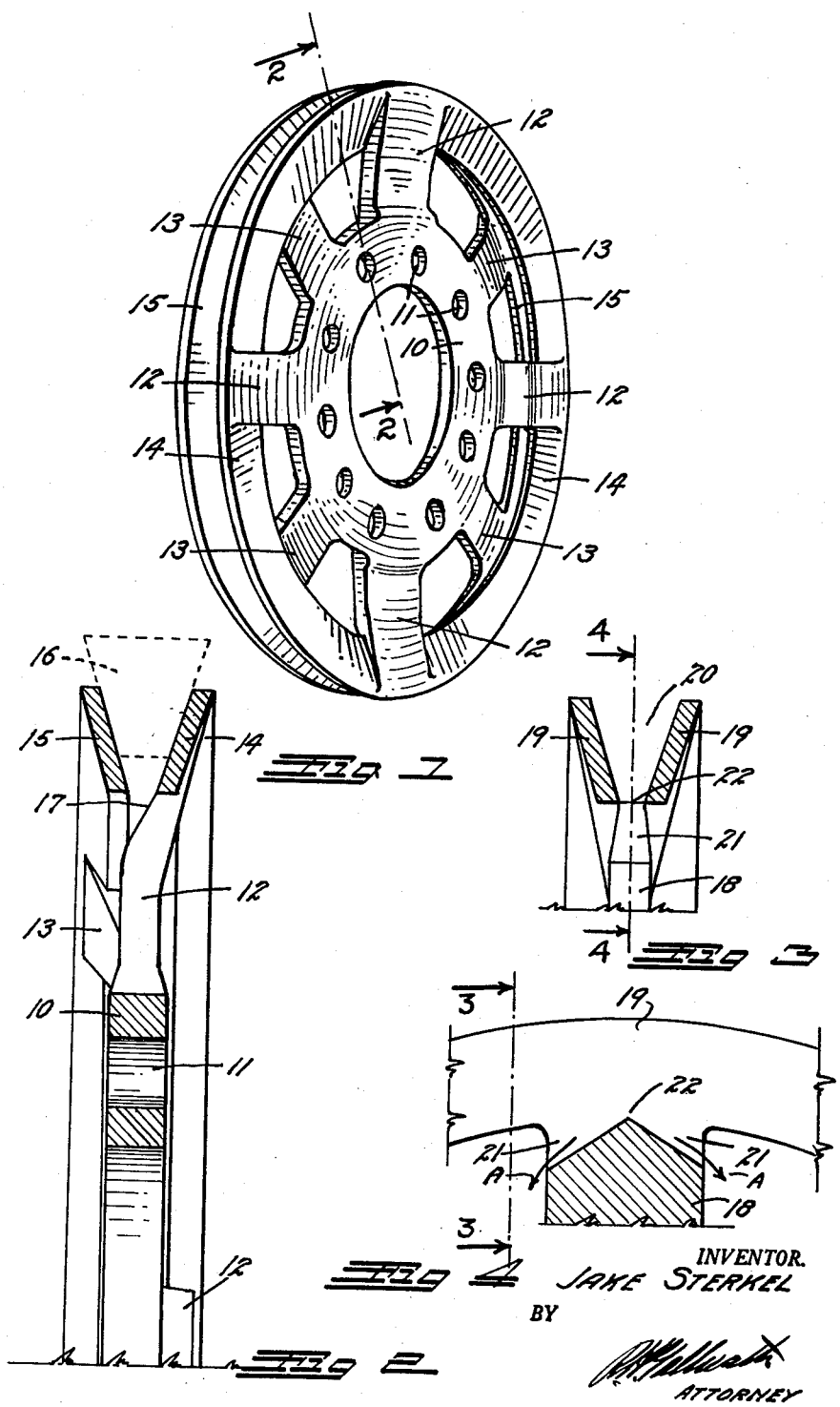

2,933,935

V-BELT SHEAVES

Jake Sterkel, Lakewood, Colo.; Denver National Bank, administrator of the estate of said Jake Sterkel, deceased, assignor, by mesne assignments, to Dayton Tandem V-Belt Drive Co., Dayton, Ohio, a corporation of Ohio Application January 7, 1957, Serial No. 632,692

4 Claims. (Cl. 74—230.5)

This invention relates to a V-belt sheave, and more particularly to a sheave to be used under adverse weather conditions, such as illustrated and described in applicant's prior Patent No. 2,733,612.

Metallic V-belt sheaves operating where subjected to ice, snow, mud, rain and freezing temperatures have a tendency to build up frozen debris in the bottom of the V-belt groove. The accumulated debris packs and gradually increases the diameter of the sheave until a point is reached where the increased tension in the belt results in damage to the belt or V-belt sheaves.

Th principal object of this invention is to provide a self-cleaning V-belt sheave which will prevent the accumulation of debris in the V-belt groove so as to eliminate damage to the belt.

Attempts have been made to eliminate accumulated deposits in the V-belt groove by forming discharge passages therein. Such passages, however, have not been universally satisfactory since ice would continue to form over the extremities of the spokes of the sheave in spite of the discharge passages between the spokes.

An object of this invention is to provide a structure for V-belt sheaves which will provide a continuous discharge passage in the bottom of the V-belt groove both intermediate and over the spokes throughout the entire periphery of the sheave so as to eliminate the accumulation of material at the points where the spokes join the V-belt-receiving groove of the sheave.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view of the improved V-belt sheave;

Fig. 2 is an enlarged cross-section through one-half the improved sheave, taken on the line 2—2, Fig. 1;

Fig. 3 is a similar cross-section through an alternate form of the V-belt sheave, illustrating a second means for eliminating accumulated debris at the spoke points; and Fig. 4 is a fragmentary section, taken on the line 4—4, Fig. 3.

While the sheave is more particularly designed to be applied to the wheel lug bolts of a conventional motor vehicle for providing a V-belt drive for the ordinarily idle wheels thereon, it is not limited to this particular use but will be found valuable wherever it is desired to prevent the accumulation of foreign materials in the groove of a V-belt sheave.

The improved sheave comprises a circular central disc 10 provided with lug bolt holes 11 by means of which it may be attached to a rotatable hub or wheel. A plurality of spokes 12 and 13 radiate from the central disc 10 in alternating relation. The spokes 12 support an inclined annular V-belt channel side 14, and the intermediate spokes 13 support a similar but oppositely inclined annular V-belt channel side 15.

The channel sides 14 and 15 are maintained in uniformly spaced-apart relation by their respective spokes and incline outwardly from each other as the periphery of the sheave is approached to form a channel for receiving a conventional V-belt, as indicated in broken line at 16, the bottom of the channel being completely open and unobstructed throughout the entire periphery of the sheave in a radially inward direction.

At the points where the spokes join the channel sides 14 and 15, the inner surfaces of the spokes are inclined substantially, as indicated at 17, in correspondence to the incline of the channel sides so that there will be no projections of any nature to retain and build up accumulations of ice and other materials.

While in the embodiment of the invention illustrated four spokes have been illustrated supporting each side of the V-belt groove making a total of eight spokes for the sheave, the invention is not to be regarded as limited to this specific number of spokes.

In Figs. 3 and 4 an alternate form of the invention is illustrated in which all of the spokes, indicated at 18, join the two sides 19 of a V-belt groove 20. The two sides 19 of the groove are spaced from each other similarly to the two sides 14 and 15, previously described, and both sides are joined to or formed on the extremities of the spokes 16.

Each spoke, however, is cut back on the leading and trailing edge of its circumferential extremity to form inclined passageways 21 having a width equal to the spacing between the sides 19 and a length equal to one-half the width of the spoke. Foreign material entering the V-belt groove 20 will be forced through the space therebetween and into the open spaces between the spokes thereof. At the points where the spokes join the channel sides, the material will be forced into the inclined passages 21 in the extremities of the spokes and will be forced therefrom, as indicated by the arrows "A" in Fig. 4.

In the first described form, there is no part of the sheave extending across the space between the two side portions 14 and 15. In the second form of the invention a pointed apex on each spoke, indicated at 22, extends between the two side portions. This relatively sharp apex, however, has very little tendency to retain and accumulate material in the V-belt groove 20.

While a specific form of the improvement has been described and illustrated herein, it is to be understood that the same may be varied within the scope of the appended claims, without departing from the spirit of the invention.

Having thus described the invention, what is claimed and desired secured by Letters Patent is:

1. A V-belt sheave comprising: a generally circular hub disc having openings through which said disc may be concentrically attached to a rotating member; a first series of spaced-apart spokes radiating from said disc; a second series of spaced-apart spokes similarly radiating from said disc, the spokes of said second series being positioned intermediate the spokes of the first series; a first annular V-belt groove side concentrically supported by the spokes of the first series; and a second annular V-belt groove side supported by the spokes of the second series in spaced concentric relation to the first V-belt groove side, said two V-belt groove sides being positioned at an angle to each other so as to flare away from each other at their outer peripheries and approach each other at their inner peripheries, and being completely separated from each other so as to form a continuous and uninterrupted opening between the two V-belt sides extending in a radially inward direction completely about the sheave.

2. A V-belt sheave comprising: a generally circular hub disc having openings through which said disc may be concentrically attached to a rotating member; a first series of spaced-apart spokes radiating from said disc; a second series of spaced-apart spokes similarly radiating from said disc, the spokes of said second series being positioned intermediate the spokes of the first series; a first annular V-belt groove side concentrically supported by the spokes of the first series; and a second annular V-belt groove side supported by the spokes of the second series in spaced concentric relation to the first V-belt groove side, said two V-belt groove sides being positioned at an angle to each other so as to flare away from each other at their outer peripheries and approach each other at their inner peripheries, and being completely separated from each other so as to form a continuous and uninterrupted opening between the two V-belt sides extending in a radially inward direction completely about the sheave, the portion of each spoke adjacent said disc lying in the plane of said disc and the portion of each spoke adjacent the V-belt groove side supported thereby being inclined in substantial correspondence to the incline of the supported V-belt groove side.

3. A V-belt sheave comprising: a circular disc provided with attachment-receiving openings whereby it may be attached to a rotating element; a plurality of spokes radiating from said disc in the plane of the latter; and two spaced-apart, annular, concentric V-belt groove sides supported in spaced-apart relation on said spokes so as to provide an open channel completely about said sheave between said groove sides and over said spokes, the circumferential extremities of the spokes at the points where they join the groove sides being alternately oppositely inclined to form inclined passages in the spoke extremities extending from said open channel defining a continuous opening for discharge of accumulated material extending radially inward of said channel around the entire circumference thereof.

4. A V-belt sheave comprising a metallic casting consisting of: a generally flat, circular hub disc; a first series of spokes extending radially from said disc in uniformly spaced-apart relation; a first annular V-belt groove side integrally formed on the extremities of said spokes and being solely supported by the spokes of the first series concentric of said disc; a second series of spokes extending radially from said disc, the spokes of the second series being positioned intermediate the spokes of the first series; and a second annular V-belt groove side corresponding in diameter to the first annular V-belt groove side integrally formed on the extremities of the spokes of the second series and being solely supported by the spokes of the second series in parallel, spaced-apart relation to the first annular V-belt groove side so that a V-belt will be frictionally supported between the two V-belt groove sides defining a continuous and uninterrupted opening extending radially inward of said groove sides around the entire circumference thereof.

References Cited in the file of this patent

UNITED STATES PATENTS

| | | |
|---|---|---|
| 36,318 | Woodworth | Aug. 26, 1862 |
| 93,067 | Davis | July 27, 1869 |
| 302,954 | Stephens | Aug. 5, 1884 |
| 2,363,105 | Wine | Nov. 21, 1944 |

FOREIGN PATENTS

| | | |
|---|---|---|
| 826,810 | Germany | Jan. 7, 1952 |